US006633586B1

United States Patent
Heiss

(10) Patent No.: US 6,633,586 B1
(45) Date of Patent: Oct. 14, 2003

(54) METHOD FOR INDIVIDUALIZED-CONNECTION DETERMINATION OF THE CURRENTLY PERMITTED TRANSMISSION RATE OF ATM CELLS

(75) Inventor: Herbert Heiss, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/440,558

(22) Filed: Nov. 15, 1999

(30) Foreign Application Priority Data

Nov. 13, 1998 (DE) ......................................... 198 52 427

(51) Int. Cl.[7] ................................................ H04J 3/16
(52) U.S. Cl. ..................................... 370/468; 370/395.1
(58) Field of Search ............................... 370/468, 395.1, 370/230, 230.1, 232, 236.1, 235

(56) References Cited

U.S. PATENT DOCUMENTS

| 5,745,477 A | * | 4/1998 | Zheng et al. | ............... | 370/230 |
| 5,940,368 A | * | 8/1999 | Takamichi et al. | .......... | 370/229 |
| 6,038,217 A | * | 3/2000 | Lyles | ......................... | 370/233 |
| 6,137,779 A | * | 10/2000 | Miller et al. | ................. | 370/236 |
| 6,178,159 B1 | * | 1/2001 | He et al. | ...................... | 370/234 |
| 6,226,265 B1 | * | 5/2001 | Nakamichi et al. | ......... | 370/235 |

FOREIGN PATENT DOCUMENTS

| EP | 0 830 050 A2 | 3/1998 |
| JP | 10 065694 | 3/1998 |

OTHER PUBLICATIONS

ITU–T I.371.1, Internation Telecommunication Union, "Traffic control and congestion control in B–ISDN: conformance definitions for ABT and ABR," Jun. 1997, ppl. 13–18.*
Communication from EPO.
JL Adams et al., The Support of the Available Bit Rate Bearer Capability Using Virtual Source/Destination Concepts, Jul. 1995, BT Technol J vol. 13, No. 3, pp. 67–79.
Katsumi Yamato et al. Congestion Control for ABR Service Based on Dynamic UPC/NPC, IEICE Feb. 1996 Trans. Commun. vol. E79–B, No. 2.
ITU–T 1.371.1 Jun. 1997, International Telecommunication Union Traffic control and congestion control in B–ISDN: conformance definitions for ABT and ABR, pp. 13–18.
"Traffic Management Specification Version 4.0", ATM Forum Specification AF–TM–0056.000, Apr. 1996, pp. 92–96; XP002114564.

* cited by examiner

Primary Examiner—Chau Nguyen
Assistant Examiner—Nittaya Juntima
(74) Attorney, Agent, or Firm—Fish & Richardson P.C.

(57) ABSTRACT

The method proposed in ITU-I.371.1 for the individualized-connection determination of the currently allowed transmission rate of ATM cells is inventively realized with the assistance of list parameters, whereby the list parameters indicate the plurality of current intermediately stored transmission rates and their size relationship relative to one another. As a result of this, a more efficient utilization of the computer resources of the ATM communication devices is achieved, as is a greater flexibility in view of the processing sequence of the individual method steps.

18 Claims, 2 Drawing Sheets

METHOD FOR INDIVIDUALIZED-CONNECTION DETERMINATION OF THE CURRENTLY PERMITTED TRANSMISSION RATE OF ATM CELLS

BACKGROUND OF THE INVENTION

1. Field of the Invention

The invention relates to a method for determining an individualized-connection currently allowed transmission rate of ATM cells of virtual connections having variable transmission rates, which utilize time change information allocated to transmission rate changes within an ATM communication system.

2. Description of the Prior Art

A large variety of monitoring procedures are used to monitor variable transmission rates of ATM (asynchronous transfer mode) cells of virtual connections within an ATM communication network (as well as other existing and future packet-oriented communications systems). One such procedure is known as the "Dynamic Generator Cell Rate Algorithm (DGCRA)", described in the ITU I.371.1; it is used particularly for ABR (Available Bit Rate) connections within an ATM communication network.

Overload situations in an ATM communication system can be recognized with the assistance of the DGCRA monitoring procedure and measures can be subsequently initiated for eliminating such overload conditions. In order to be able to assure an efficient monitoring of the variable transmission rates for ABR traffic within an ATM communication system, the currently allowed transmission rate (at any specific point in time—generally referred to as "Allowed Cell Rate" (ACR)) is continuously required for implementing the DGCRA monitoring procedure. The currently allowed transmission rate of ATM cells thus describes the transmission rate to be monitored at the time of the monitoring procedure.

Connection-related data as well as data describing the current condition of the connection segments are additionally communicated to the receiver via the resource managements cells transmitted in a second communication direction. These are communicated with the assistance of resource management cells (RM), i.e., control cells periodically inserted into the cell stream by a transmission device in a first communication direction opposite the second.

After the arrival of a resource management cell communicated in a second transmission direction in an ATM communication system, a check is carried out (among other things) to see whether the explicit transmission rate entered in the resource management cell can be made available by an ATM communication system for the existing, virtual connection. A further check is carried out to see whether an adaptation of the explicit transmission rate is required in order to avoid a data jam in the ATM communication system. When this is the case, the explicit transmission rate read from the resource management cell is then replaced by the transmission rate that can be communicated from the ATM communication system. This assures that the receiver is informed of the explicit transmission rate by the resource management cell, namely the transmission rate with which data can be sent without causing a traffic jam.

For determining the currently allowed transmission rate, proposal I.371.1, (Traffic Control and Congestion Control in B-ISDN: Conformance Definitions for ABT and ABR" of the International Telecommunication Union (ITU)) defines, among other things, two individualized-connection delay times providing assistance for calculating the point in time of an increase or, respectively, lowering of transmission rate with respect to the currently allowed transmission rate of ATM cells of a virtual connection. The proposal also explains a method for determining the currently allowed transmission rate of ATM cells with the assistance of three intermediately stored transmission rates and the appertaining time change information.

Applying this method, both the currently allowed transmission rate as well as the appertaining time change information for monitoring this transmission rate are calculated proceeding from the explicit transmission rate of ATM cells read from an incoming resource management cell. The currently allowed transmission rate is adapted to the modified transmission rate with the assistance of counters, two counters are required for each connection for determining a first and a second time change information.

When the counter representing a first time change information runs down, the currently allowed transmission rate is set to the previously determined new value with the assistance of an adaptation routine, and the first time change information is replaced by a second time change information. Subsequently, the updated currently allowed transmission rate of ATM cells is monitored by the DGCRA monitoring procedure until the counter representing a current time change information has run down and a correction of the currently allowed transmission rate is required.

Each virtual connection is provided at least two counters for the realization of the time change information, and at least three memory units for storing the transmission rates for the determination of the respective, per-call, currently allowed transmission rate of ATM cells.

SUMMARY OF THE INVENTION

The object of the invention is to improve the determination of the currently allowed transmission rate of ATM cells of virtual connections of an ATM communication system. This object is achieved by utilizing time change information allocated to transmission rate changes within an ATM communication system for determining the individualized-connection currently allowed transmission rate, intermediately storing a determined individualized-connection transmission rate of ATM cells, if it exists, in a memory unit, intermediately storing time change information relating to the transmission rate, if the time change information exists, in the memory unit, calculating the time change information using two individualized-connection prescribable delay times and utilizing a transmission rate handling routine, updating the time change information if it upwardly exceeds a predetermined time span by an updating routine, utilizing a current time value of a calendar information and an individualized-connection calendar information, utilizing a list parameter to indicate relative size relationships among a plurality of current the intermediately stored transmission rates, and determining the currently allowed transmission rate and updating the list parameter using the list parameter.

The basic aspect of the inventive method is in intermediately storing: 1) a per-call specific transmission rate of ATM cells (if it exists), and 2) appertaining time change information (if it exists); these are stored in a memory unit in the determination of the currently allowed transmission rate of ATM cells of virtual connections with variable transmission rates. They are, in addition, stored with the assistance of time change information within an ATM communication system allocated to transmission rate changes.

Furthermore, the calculation of the time change information of transmission rate changes ensues with the assistance of two per-call prescribable delay times, ensuing with a transmission rate handling routine. The time change information following the expiration of a predetermined time span are updated by an updating routine with the assistance of a current time value, a calendar information and an individualized-connection calendar information.

The plurality of current intermediately stored transmission rates and their size relationship relative to one another is displayed with the assistance of a list parameter, whereby the determination of the currently allowed transmission rate and an updating of the list parameter value ensues with the assistance of the list parameter value. The employment of a simple, additional list parameter yields the advantage that the maximum transmission rate of ATM cells defined in the proposal I.371.1, "Traffic Control and Congestion Control in B-ISDN: Conformance Definitions for ABT and ABR" of the ITU is not required in the inventive method, and, thus, need not be stored and processed. This eliminates the use of memory and dynamically relieves the ATM communications system, even in light of the dynamically processed list parameter.

Moreover, the updating of the currently allowed transmission rate of ATM cells can be decoupled in time from the transmission rate handling routine with the assistance of the list parameter so that a non-time-critical implementation of the inventive method is possible compared to the proposed method in the communication means cited in ITU I.371.1. It is thereby especially advantageous in the inventive method that no individualized-connection counters representing the time change information are required—the currently allowed transmission rate are matched to the transmission rate change after the counters run down. Inventively, this adaptation of the currently allowed transmission rate ensures when the currently allowed transmission rate is made available for the monitoring procedure. This more uniformly distributes the load on the control unit of the ATM communication system and reduces peak loads that occur.

According to a further development of the inventive method, the individualized-connection determination of the currently allowed transmission rate of ATM cells for a virtual connection is implemented either upon arrival of an ATM cell in a first transmission direction or with the arrival of a resource management cell in a second transmission direction directed opposite to the first or after an expiration of the predetermined time span in the ATM communication system.

The adaptation of the currently allowed transmission rate can be advantageously implemented at different points in time and is not fixed in time by the run-down of an individualized-connection counter representing the time change information. This achieves flexibility in the sequence of the handling of the individual method steps for determining the currently allowed transmission rate, and particularly enables an advantageous utilization of the computer resources of the ATM communication system.

When the value of the list parameter is a first list parameter value, advantageously, no current transmission rate of ATM cells is intermediately stored. When this list parameter is a second list parameter value, a first, current transmission rate of ATM cells is intermediately stored. When the list parameter is a third list parameter value, two current transmission rates are intermediately stored, whereby the first transmission rate is lower than the second transmission rate. Finally, when the list parameter is a fourth list parameter value, two current transmission rates are intermediately stored, whereby the first transmission rate is higher than the second transmission rate.

This means that, using a small information scope (2 bits), information about the plurality of existing, current transmission rates and their size relationships relative to one another are imaged onto the list parameter. The list parameter value thus represents information about the constellation of the intermediately stored transmission rates that, for example, must be respectively re-calculated in the method disclosed in the ITU I.371.1 when the previous information about the constellation of the intermediately stored transmission rates is required for the execution of the method.

According to an advantageous development of the inventive method, a first time change information is allocated to a first current intermediately stored transmission rate, and a second time change information is allocated to a second, current intermediately stored transmission rate. The allocation of the current intermediately stored transmission rates to the time change information is adapted to the ITU-I Standard I.371.1.

According to a further development of the inventive method, a current, individualized-connection time value is allocated to the current time value given a coincidence of the calendar information with the individualized-connection calendar information; otherwise, the sum of the current time value and the predetermined time span is allocated to the current, individualized-connection time value.

Subsequently, when the presence of a current individualized-connection time value is higher than the second, intermediately stored time change information, the value of the second, current intermediately stored transmission rate is subsequently allocated to the currently allowed transmission rate when the list parameter is a third or fourth list parameter value and the first list parameter value is allocated to the list parameter.

Otherwise, when the presence of a current individualized-connection time value is higher than the first intermediately stored time change information, the value of the first, current intermediately stored transmission rate is allocated to the currently allowed transmission rate, the value of the second, current intermediately stored transmission rate is allocated to the first, current intermediately stored transmission rate, the value of the second time change information is allocated to the first time change information, and the second is allocated to the list parameter.

When the list parameter is a second list parameter value, the value of the first current intermediately stored transmission rate is allocated to the currently allowed transmission rate when a current individualized-connection time value is higher than the first intermediately stored time change information and the first list parameter value is allocated to the list parameter, and no updating of the intermediately stored time change information, of the currently allowed transmission rate, and of the list parameter is implemented at a first list parameter value.

This advantageous updating of the currently allowed transmission rate with the assistance of the list parameter enables—among other things—an especially simple, circuit-oriented realization within the ATM communication system.

A further advantage of the inventive method is that an explicit transmission rate is read from an incoming resource management cell communicated in the second transmission direction and is intermediately stored in the ATM communication system. This explicit transmission rate represents the currently possible transmission rate transmittable in the first transmission direction in a further ATM communication system, and the further ATM communication system enters this explicit transmission rate into the resource management cell with the currently possible transmission capacity. The reading and intermediate storing of the explicit transmission rate is adapted to the ITU-I Standard I.371.1.

Advantageously, the two individualized-connection pre-scribable delay times are represented by a first delay time representing a transmission rate increase, and by a second delay time representing a transmission rate decrease, whereby the first delay time is shorter than the second delay time. The representation of an increase or decrease in transmission rate by two individualized-connection pre-scribable delay times is adapted to the ITU-I Standard I.371.1.

Further advantageous developments of the inventive method can be derived from the discussion below.

BRIEF DESCRIPTION OF THE DRAWINGS

The inventive method is explained in greater detail below on the basis of a block circuit diagram and flowcharts.

DESCRIPTION OF THE PREFERRED EMBODIMENTS

Figure 1:
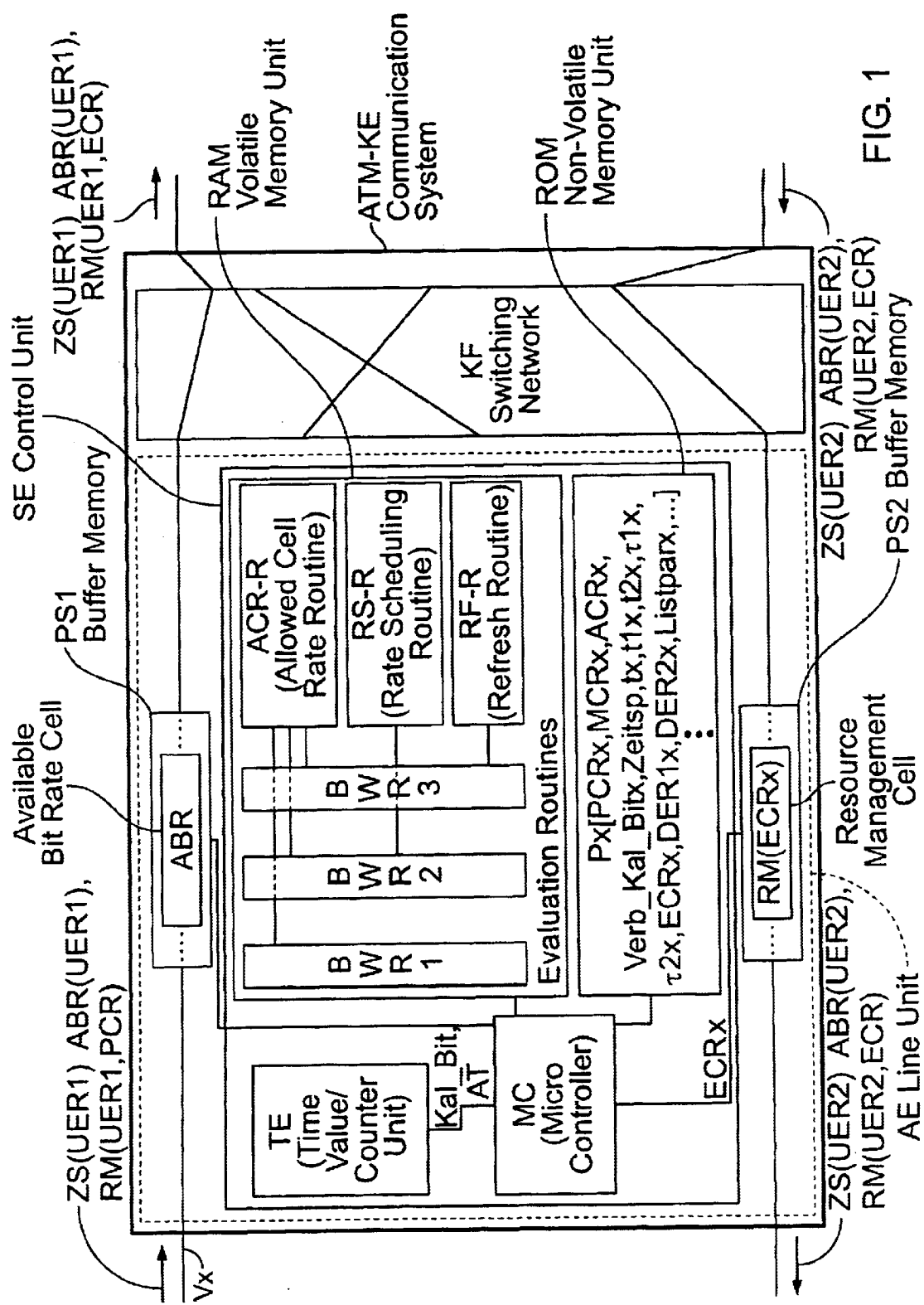
FIG. 1 is a block circuit diagram of an ATM communication system suitable for the realization of the inventive method.

The block circuit diagram of FIG. 1 schematically shows an ATM communication system ATM-KE working according to the asynchronous transfer mode, whereby an exemplary virtual connection Vx is indicated by a first cell stream ZS (UER1) with a first transmission direction UER1 and a second cell stream ZS (UER2) with a second transmission direction UER2. ATM cells are transmitted via the virtual connections Vx according to the asynchronous transfer mode, whereby variable transmission rates are provided for the transmission of the ATM cells of virtual connections.

For virtual connections with variable transmission rates, the ATM cells to be transmitted are referred to as available bit rate cells ABR(UER1)/ABR(UER2). Control cells that are referred to as resource management cells RM (UER1)/RM (UER2) are additionally periodically inserted into the first cell stream ZS (UER1) in a transmitter. By way of example, FIG. 1 shows the first cell stream ZS (UER1) composed of first available bit rate cells ABR (UER1) and first resource management cells RM (UER1). In adaptation to the ITU-I Standard I.371.1, the explicit transmission rate ECRx is initialized with a maximum transmission rate PCRx upon setup of a virtual connection and is entered into the resource management cell RM (UBR1, PCRx). The second cell stream ZS (UER2) is composed analogous to the first, being composed of second available bit rate cells ABR (UER2) and of second resource management cells RM (UER2).

The ATM communication system ATM-KE comprises a plurality of line units AE connected via a switching network KF, although FIG. 1 only shows one exemplary line unit of the ATM communication system ATM-KE for a virtual connection $Vx_1$—the inventive method may be analogously realized in further line units AE.

Buffer memories PS1/PS2 are provided in the line units AE for the purpose of intermediate storage of the available bit rate cells ABR (UER1)/ABR (UER2) and of the resource management cells RM (UER1)/RM (UER2), whereby the first buffer memory PS1 has the first cell stream ZS (UER1) allocated to it, and the second buffer memory PS2 has the second cell stream ZS (UER2) allocated to it.

Furthermore, the line unit AE comprises a control unit provided for determining the currently allowed transmission rate ACRx and the control unit is connected to the two buffer memories PS1/PS2, in which the currently allowed transmission rate ACRx is identified for the program-oriented implementation, with the assistance of first, second and third evaluation routines BWR1/2/3.

The control unit SE is composed of a time value/counter unit TE provided for determining the current time value AT, as well as of a micro controller MC and of two further volatile memory units RAM or, respectively, two non-volatile memory units ROM, whereby the current time value AT of the respective ATM communication system ATM-KE is calculated by the time value/counter TE.

The micro controller MC is provided for the program-oriented implementation of the inventive method and, to that end, is connected to the two buffer memories PS1/PS2, to the time value/counter unit TE, to a volatile memory unit RAM and to a non-volatile memory unit ROM. Additionally, a calendar information Kal_Bit comprises one bit and is inverted when an upper boundary of a predetermined time span is exceeded. The current time value AT assists in an implementation of updating the current individualized-connection time value tx. Both the calendar information Kal_Bit and the current time value AT are made available to the micro controller MC by the time value/counter unit TE.

All individualized-connection parameters Px required for the implementation of the inventive method are intermediately stored in the non-volatile memory unit ROM, and are read out as needed from the non-volatile memory unit ROM by the micro controller MC. The following parameters Px for the virtual connection Vx are intermediately stored, by way of example, in the non-volatile memory ROM in FIG.1:

1:

| | |
|---|---|
| PCRx | maximum transmission rate of ATM cells |
| MCRx | minimum transmission rate of ATM cells |
| ACRx | currently allowed transmission rate |
| Verb_Kal_Bitx | connection-associated calendar information |
| Zeitsp | predetermined time span |
| tx | connection-associated time value |
| t1x | first time change information |
| t2x | second time change information |
| τ1x | first delay time |
| τ2x | second delay time |
| ECRx | explicit transmission rate |
| DER1x | first intermediately stored transmission rate |
| DER2x | second intermediately stored transmission rate |
| Listparx | list parameter |

The maximum transmission rate PCTx is understood to be the standard-defined rate that can be realized in a transmission-oriented communication for an existing virtual connection. By analogy to the maximum transmission rate, a minimum transmission rate MCRx is defined by a standard that represents the lowest realizable transmission rate of an existing virtual connection. Furthermore, the currently allowed transmission rate ACRx is stored; resource-optimized ATM cell traffic is assured this rate when it is adhered to, and this rate must therefore be made available to the respective monitoring procedure for monitoring. The currently allowed transmission rate ACRx is initialized with the initial transmission rate ICRx at the connection set up Due to the individualized-connection calendar information Verb_Kal_Bitx, the synchronization of the current time value AT and the individualized-connection time value tx is supported, and the exceeding of a predetermined time span Zeitsp by the current time value AT is co-indicated, whereby the individualized-connection calendar information Verb_Kal_Bitx is initialized with the currently determined calendar information Kal_Bit at the connection set up.

Furthermore, the individualized-connection time value tx, the first delay time $\tau 1x$ and the second delay time $\tau 2x$ are intermediately stored; one must rely on the arrival of the respective available bit rate cell ABR(UER1) delayed by the first delay time $\tau 1x$ for an increase in transmission rate, and one must rely on an arrival of the respective available bit rate cell ABR(UER1) delayed by the second delay time $\tau 2x$ for a lowering of the transmission rate. The first delay time $\tau 1x$ is selected shorter than the second delay time $\tau 2x$, in agreement with the ITU-I Standard I.371.1.

An explicit transmission rate per connection ECRx is intermediately stored, which is read from the second resource management cell RM(UER2) and is used, with the assistance of the inventive method, for determining the currently allowed transmission rate ACRx. After processing the second evaluation routine BWR2, the explicit transmission ECRx read from the second resource management cell RM(UER2) is intermediately stored as a second intermediately stored transmission rate DER2x, and a first intermediately stored transmission rate DER1x is offered for implementation of the inventive method.

In the connection set up, the value of the initial transmission rate ICRx is allocated to the second, intermediately stored transmission rate DER2x and to the explicit transmission rate ECRx intermediately stored in the non-volatile memory unit ROM. A first time change information t1x and a second time change information t2x are respectively individualized-connection allocated to these intermediately stored transmission rates DER1x/DER2x; a time change information with respect to the transmission rate is the point in time 1) at which the monitoring procedure must rely on a change in transmission rate or, respectively, 2) at which the modified transmission rate must be monitored.

A critical component part of the inventive method is the list parameter with whose assistance the plurality of current intermediately stored transmission rates DER1x/DER2x and their size relationship relative to one another is indicated. The list parameter can assume the following values:

| List Parameter Value | Meaning |
| --- | --- |
| 0 | No transmission rate intermediately stored |
| 1 | A transmission rate intermediately stored, whereby DER1x = DER2x applies |
| 2 | Two transmission rates intermediately stored, whereby DER1x > DER2x applies |
| 3 | Two transmission rates intermediately stored, whereby DER1x < DER2x applies |

The value zero is allocated to the list parameter at the connection set up. Based on the current value of the list parameter Listparx, the determination of the currently allowed transmission rate ACRx is implemented with the assistance of the respective evaluation routine BWR1/2/3.

By contrast to the non-volatile memory ROM, the evaluation routines BWR1/2/3 representing the inventive method are intermediately stored in the volatile memory unit RAM. These evaluation routines in turn access further routines: the allowed cell rate routine ACR-R, the transmission rate handling routine RS-R and the refresh routine RF-R. The first evaluation routine BWR1 accesses the allowed cell rate routine ACR-R, the second evaluation routine BWR2 accesses the allowed cell rate routine ACR-R, and the transmission rate handling routine RS-R and the third evaluation routine BRW3 accesses the allowed cell rate routine ACR-R and the refresh routine RF-R. All three evaluation routines BWR1/2/3 are implemented programmatically with the assistance of the micro controller MC, with the micro controller MC initiating the read and write cycles with respect to the non-volatile memory unit ROM required for this purpose.

Figure 2:
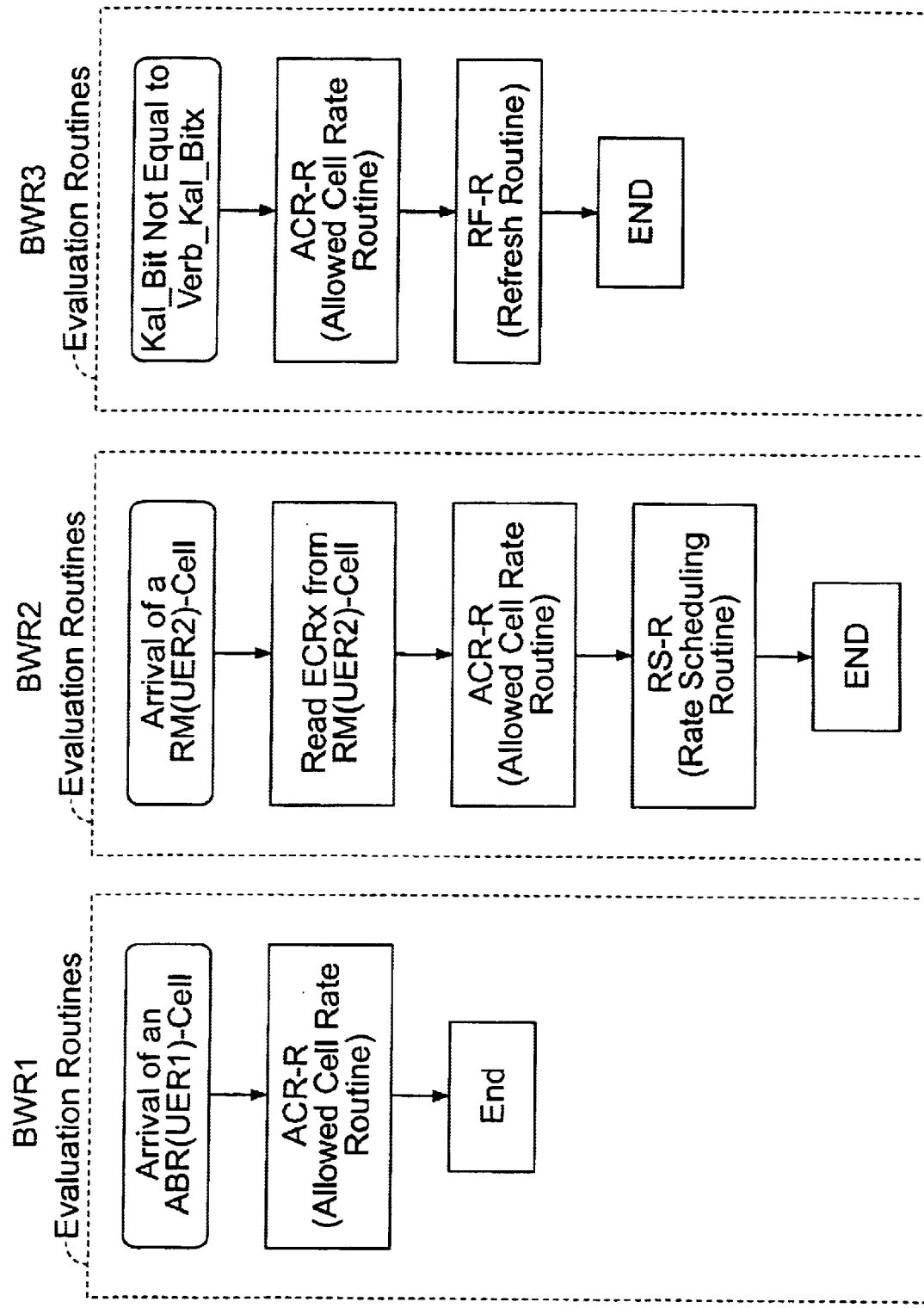
FIG. 2 contains flowcharts of three different handling routines.

The individual evaluation routines BWR1/2/3 are explicitly explained in greater detail in FIG. 2 with the assistance of flowcharts, in which the individual evaluation routines BWR1/2/3 are processed in an event-controlled manner with the assistance of the micro controller MC.

For example, the arrival of a first available bit rate cell ABR(UER1) transmitted in the first transmission direction UER1 in the first buffer memory PS1 is recognized programmatically by the micro controller MC. The first evaluation routine BWR1 is started, and the parameters Px required for the implementation of the first evaluation routine BWR1 are loaded from the non-volatile memory unit ROM into the volatile memory RAM during the course of a read cycle. The allowed cell rate routine ACR-R is processed first, whereby the calendar information Kal_Bit is compared to the individualized-connection calendar information Verb_Kal_Bitx in a first step, and the value of the current time value AT is allocated to the individualized-connection time value tx if they coincide. Otherwise, i.e., given the presence of different calendar information Kal_Bit, Verb_Kal_Bitx, the aggregate value of current time value AT and the predetermined time span Zeitsp is allocated to the individualized-connection time value tx.

After this, the main part of the allowed cell rate routine ACR-R is processed, this being composed of the following steps:

If (Listparx=2) or (Listparx=3)
  then, if tx≧t2x
    then ACRx=DER2x
      Listparx=0
      otherwise, if tx≧t1x
        then ACRx=DER1x
          DER1x=DER2x
          tx1=tx2
          Listparx=1
otherwise, if Listparx=1
  then, if tx≧t1x
    then ACRx=DER1x
      Listparx=0

After processing the allowed cell rate routine ACR-R, the first evaluation routine BWR1 is ended, and the parameters modified during the course of the first evaluation routine BWR1 are updated in the non-volatile memory unit ROM. Upon the arrival of a further available bit rate cell ABR(UER1)incoming in the first transmission direction UER1, the first evaluation routine BWR1 is called again by the micro controller MC insofar as the second or third evaluation routine BWR2/3 do not access the individualized-connection parameter set, i.e., they are not being implemented at the moment.

Furthermore, the micro controller MC reacts to the event "arrival of a second resource management cell RM(UER2) transmitted in a second transmission direction UER2" to the effect that the explicit transmission rate ECRx is first read from the second resource management cell RM(UER2) transmitted in the second transmission direction UER2, and then the second evaluation routine BWR2 is started. Prior to this, however, the individualized-connection parameters Px required for execution must first be loaded from the non-volatile memory unit ROM into the volatile memory unit RAM in the course of a read cycle.

The allowed cell rate routine ACR-R is first in turn accessed by the micro controller MC, and this is processed as described above. Following the allowed cell rate routine ACR-R, the transmission rate handling routine RS-R is called during the course of the second evaluation routine BWR2, and the individualized-connection parameters Px additionally required for the running of the transmission rate handling routine RS-R are loaded from the non-volatile memory unit ROM into the volatile memory unit RAM.

When processing the transmission rate handling routine RS-R, the value of the explicit transmission rate ECRx currently read from the second resource management cell RM(UER2) is compared to the value of the maximum transmission rate PCRx. If the value of the explicit transmission rate ECRx is greater than the value of the maximum transmission rate PCRx, then the value of the explicit transmission rate ECRx is set to the value of the maximum transmission rate PCRx.

Furthermore, the value of the explicit transmission ECRx rate is compared to the value of the minimum transmission rate MCRx. If the value of the explicit transmission rate ECRx is less than the value of the minimum transmission rate MCRx, then the value of the explicit transmission ECRx rate is set to the value of the minimum transmission rate MCRx.

In agreement with the ITU-I Standard I.371.1, a further check is carried out during the course of the transmission rate handling routine RS-R to determine: 1) whether the second resource management cell RM (UER2, ECR) that has arrived in the second transmission direction UER2 is not a matter of a backward explicit congestion notification cell and the value of the explicit transmission ECRx rate is unequal to the value of the second, intermediately stored transmission rate DER2x, or 2) whether the second resource management cell RM (UER2, ECR) that has arrived in the second transmission direction UER2 is a matter of a backward explicit congestion notification cell and the value of the explicit transmission rate ECRx is lower than the value of the second, intermediately stored transmission rate DER2x.

A backward explicit congestion notification cell is a cell that is generated by a further ATM communication system ATM-KE and that was inserted into the second cell stream ZS(UER2). When the aforementioned grouping of the backward explicit congestion notification cell and of the explicit transmission rate ECRx exists, then the following, remaining section of the transmission rate handling routine RS-R, the rate handling algorithm, is processed:

If Listparx≠0
then, if t1x≧tx+τ2x
   then, if ECRx≧DER1x
     Then DER1x=CRx
      If CRx≧ACRx
       Then t1x=tx+t2x
        Listparx=1
     otherwise, if ECRx<DER2x
      Then t2x=tx+τ1x
       Listparx=2
  otherwise, if ((Listparx=1) or (Listparx=2))
   Then, if ECRx≧DER1x
     T2x=tx+τ2x
      Listparx=3
     Otherwise, if CRx<DER2x
      Then t2x=tx+τ1x
       Listparx=2
     Otherwise, if CRx<DER2x
      Then DER1x=DER2x
       Tx2=tx2+τ1x
       Listparx=2
otherwise, if CRx>ACRx
  then t1x=tx+τ2x
  otherwise t1x=tx+τ1x
DER1x=CRx
Listparx=1.

At the end of the transmission rate handling routine RS-R, the value of the explicit transmission rate ECRx is allocated to the second intermediately stored transmission rate DER2x independently of the previously implemented section of the transmission rate handling routine RS-R. Subsequently, the parameters Px updated during the course of the second evaluation routine BWR2 are deposited in the nonvolatile memory unit ROM, and the second evaluation routine BWR2 is ended. The second evaluation routine BWR2 is called again by the micro controller MC upon the arrival of a further, second resource management cell RM (UER2, ECR) arriving from the second transmission direction UER2, insofar as the first or third evaluation routine BWR1/3 is not accessing the individualized-connection parameter set Px, i.e., these routines are not being implemented at the moment.

Due to the time value/counter unit TE provided for the determination of the current time value AT, the current time and the calendar information Kal_Bit are made continuously available to the micro controller MC. The time value/counter unit TE resets the current time value AT and inverts the calendar information Kal_Bit when the predetermined time span Zeitsp is exceeded.

When the micro controller MC is not occupied by the first or second evaluation routine BWR1/2, it checks, during the course of the third evaluation routine BRW3, to see whether a change or, respectively, an inversion of the calendar information Kal_Bit is present. To allow such a check, the calendar information Kal_Bit made available by the time value/counter unit TE is compared to the call-associated calendar information Verb_Kal_Bitx and, given the presence of different calendar information Kal_Bit, Verb Kal Bitx, the allowed cell rate routine ACR-R is processed analogous to the first or, respectively, second evaluation routine BWR1/2.

Furthermore, the third evaluation routine BWR3 accesses the refresh routine RF-R and implements this, whereby the individualized-connection parameters Px required for the implementation of the refresh routine RF-R are previously loaded from the non-volatile memory unit ROM into the volatile memory unit. The refresh routine RF-R is designed as follows:

if t1x≧Zeitsp
  then t1x=t1x−Zeitsp
  otherwise t1x=0
if t2x≧Zeitsp
  then t2x=t2x−Zeitsp
  otherwise t2x=0
invert Verb_Kal_Bitx.

After this, the updated, individualized-connection parameters Px are communicated from the volatile memory unit RAM into the non-volatile memory unit ROM with the assistance of the micro controller MC and are deposited therein. Subsequently, the third evaluation routine BWR3 is ended. In this case, too, the third evaluation routine BWR3 is called again by the micro controller MC upon the presence of different calendar information Kal_Bit, Verb_Kal_Bitx insofar as the first or second evaluation routine BWR1/2 are not accessing the individualized-connection parameter set Px, i.e., these routines are not being implemented at the moment.

I claim as my invention:

1. A method for determining an individualized-connection currently allowed transmission rate of ATM cells of virtual connections having variable transmission rates, comprising the steps of:

utilizing time change information allocated to transmission rate changes within an ATM communication system for determining said individualized-connection currently allowed transmission rate;

intermediately storing a determined individualized-connection transmission rate of ATM cells, if it exists, in a memory unit;

intermediately storing time change information relating to said transmission rate, if said time change information exists, in said memory unit;

calculating said time change information using two individualized-connection prescribable delay times and utilizing a transmission rate handling routine;

updating said time change information if it upwardly exceeds a predetermined time span by an updating routine, utilizing a current time value of a calendar information and an individualized-connection calendar information;

utilizing a list parameter to indicate relative size relationships among a plurality of current said intermediately stored transmission rates; and determining said currently allowed transmission rate and updating said list parameter using said list parameter.

2. A method according to claim 1, further comprising the step of:

triggering said determination of said individualized-connection currently allowed transmission rate upon the occurrence of an event, said event selected from the group consisting of:
        an ATM cell arriving in a first transmission direction;
        a resource management cell arriving in a second transmission direction opposite said first transmission direction; and
        said time change information upwardly exceeding said predetermined time span.

3. A method according to claim 1, wherein said step of intermediately storing a determined individualized-connection transmission rate further comprises the steps of:

when said list parameter is a first list parameter value, then
        maintaining said current transmission rate;

when said list parameter is a second list parameter value, then
        intermediately storing a first current transmission rate of ATM cells;

when said list parameter is a third list parameter value and when a first current transmission rate is greater than a second current transmission rate, then
        intermediately storing two current transmission rates, said two current transmission rates comprising said first current transmission rate, and said second current transmission rate, thus creating a first current intermediately stored transmission rate, and a second current intermediately stored transmission rate;

when said list parameter is a fourth list parameter value and when said first transmission rate is less than said second current transmission rate, then
        intermediately storing said two current transmission rates.

4. A method according to claim 3, further comprising the steps of:

allocating a first time change information to said first current intermediately stored transmission rate; and allocating a second time change information to said second current intermediately stored transmission rate.

5. A method according to claim 3, further comprising the steps of:

when said calendar information coincides with said individualized-connection calendar information, then
        allocating a current individualized-connection time value to said current time value;
    else
        allocating a sum of said current time value and of said predetermined time span to said current individualized-connection time value;

when said list parameter has a value selected from the group consisting of said third list parameter value and said fourth list parameter value, then
        when said current individualized-connection time value is greater than said second intermediately stored time change information, then
            allocating the value of said second current intermediately stored transmission rate to said currently allowed transmission rate, and
            allocating said first list parameter value to said list parameter;
        when said current individualized-connection time value is greater than said first intermediately stored time change information, then
            allocating the value of said first current immediately stored transmission rate to said currently allowed transmission rate,
            allocating the value of said second current intermediately stored transmission rate to said first current intermediately stored transmission rate,
            allocating the value of said second time change information to said first time change information, and
            allocating said second list parameter value to said list parameter;

when said list parameter is said second list parameter value, and when said current individualized-connection time value is greater than said first intermediately stored time change information, then
        allocating the value of said first currently intermediately stored transmission rate to said currently allowed transmission rate, and
        allocating said first list parameter value to said list parameter;

when said list parameter is said first list parameter value, then
        maintaining said first intermediately stored time change information,
        maintaining said second intermediately stored time change information, maintaining said currently allowed transmission rate, and maintaining said list parameter.

6. A method according to claim 1, further comprising the steps of:

reading an explicit transmission rate from an incoming resource management cell communicated in a second transmission direction, wherein said explicit transmission rate represents a currently possible transmission rate that can be communicated in a first transmission direction opposite said second transmission direction in a further ATM communication system;

intermediately storing said explicit transmission rate in said ATM communication system;

entering said explicit transmission rate in said resource management cell with said currently possible transmission capacity by said further ATM communication system.

7. A method according to claim 1, further comprising the step of:

representing two individualized-connection prescribable delay times by a first delay time representing an increase in transmission rate and by a second delay time representing a decrease in transmission rate, wherein said first delay time is less than said second delay time.

8. A method according to claim 3 that, upon set up of one of said virtual connections, further comprises the steps of:

initializing the currently allowed transmission rate and said second current intermediately stored transmission rate with the value of an initial transmission rate of ATM cells;

allocating said first list parameter value to said list parameter; and initializing said individualized-connection calendar information with said calendar information.

9. A method according to claim 6, further comprising the steps of:

intermediately storing two current transmission rates, said two current transmission rates comprising said first current transmission rate, and said second current transmission rate, thus creating a first current intermediately stored transmission rate, and a second current intermediately stored transmission rate; and allocating the value of a most recently read said explicit transmission rate to said second current intermediately stored transmission rate.

10. A method according to claim 2, further comprising the steps of:

defining, per said virtual connection, a minimum transmission rate and a maximum transmission rate of ATM cells;

when said resource management cell has an explicit transmission rate higher than said maximum transmission rate,
allocating the value of said maximum transmission rate to said explicit transmission rate;

when said resource management cell has an explicit transmission rate lower than said minimum transmission rate,
allocating the value of said minimum transmission rate to said explicit transmission rate.

11. A method according to claim 6, further comprising the steps of:

intermediately storing two current transmission rates, said two current transmission rates comprising said first current transmission rate, and said second current transmission rate, thus creating a first current intermediately stored transmission rate, and a second current intermediately stored transmission rate, comparing said explicit transmission rate with said second current intermediately stored transmission rate; and when said explicit transmission rate is different than said second current intermediately stored transmission rate, implementing a transmission rate handling routine.

12. A method according to claim 11, wherein said transmission rate handling routine is configured as a rate handling algorithm.

13. A method according to claim 5, further comprising the step of:

implementing a refresh routine when said calendar information does not coincide with said individualized-connection calendar information.

14. A method according to claim 1, further comprising the step of:

forming said calendar information and said individualized-connection calendar information by a one-bit information.

15. A method according to claim 5, further comprising the step of:

forming said calendar information and said individualized-connection calendar information by a one-bit information.

16. A method according to claim 8, further comprising the step of: forming said calendar information and said individualized-connection calendar information by a one-bit information.

17. A method according to claim 13, further comprising the step of:

forming said calendar information and said individualized-connection calendar information by a one-bit information.

18. A method according to claim 6, further comprising the steps of:

intermediately storing two current transmission rates, said two current transmission rates comprising said first current transmission rate, and said second current transmission rate, thus creating a first current intermediately stored transmission rate, and a second current intermediately stored transmission rate;

comparing said explicit transmission rate with said second current intermediately stored transmission rate;

when said explicit transmission rate is lower than said second current intermediately stored transmission rate, implementing a transmission rate handling routine;

wherein said step of reading said explicit transmission rate is reading said explicit transmission rate from a resource management cell inserted into a second cell stream in said second transmission direction by said section further ATM communication system.

* * * * *